(12) United States Patent  (10) Patent No.: US 7,957,768 B2
Smith et al.  (45) Date of Patent: Jun. 7, 2011

(54) WIRELESS COMMUNICATION DEVICE

(75) Inventors: Elizabeth Smith, San Diego, CA (US);
Mary Lauricella, Schiller Park, IL (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 860 days.

(21) Appl. No.: 11/846,341

(22) Filed: Aug. 28, 2007

(65) Prior Publication Data

US 2009/0061942 A1  Mar. 5, 2009

(51) Int. Cl.
*H04M 1/00* (2006.01)

(52) U.S. Cl. ............... 455/566; 455/556.1; 455/575.4; 345/168; 361/683

(58) Field of Classification Search ............... 455/566, 455/550.1, 575.1, 575.4, 556.1; 345/168; 296/287; 361/683
See application file for complete search history.

(56) References Cited

U.S. PATENT DOCUMENTS

| | | | |
|---|---|---|---|
| 5,189,632 A | 2/1993 | Paajanen et al. | |
| 6,047,196 A | 4/2000 | Makela et al. | |
| 6,233,467 B1 | 5/2001 | Rydbeck | |
| 6,415,138 B2 | 7/2002 | Sirola et al. | |
| 6,587,096 B2 * | 7/2003 | Bullister | 345/168 |
| 6,983,170 B2 | 1/2006 | Stulberger | |
| 7,489,503 B2 * | 2/2009 | Maatta | 361/679.27 |
| 2006/0159443 A1 * | 7/2006 | Cho et al. | 396/287 |

OTHER PUBLICATIONS

Greatcall, Inc., "Easy Emergency Cell Phones",2006-2007, Jitterburg Phones, 1 page article, www.jitterbug.com, web site last visited Aug. 28, 2007.

* cited by examiner

*Primary Examiner* — Danh C Le
(74) *Attorney, Agent, or Firm* — Moazzam & Associates, LLC

(57) ABSTRACT

A system that incorporates teachings of the present disclosure may include, for example, a wireless communication device including a housing assembly formed from a first section that is rotatably coupled about an axis to a second section such that the first and second sections are movable between a closed position in which a first side of the first section is aligned with and in close proximity to a first side of the second section. The wireless communication device can also include a first display screen positioned in the first section and a second display screen positioned in the second section. The first and second display screens can be configured to display images. The wireless communication device can also include a keypad including keys on the first and second sections, thereby creating a foldable keypad rotatable about the axis between the first and second sections. Additional embodiments are disclosed.

14 Claims, 5 Drawing Sheets

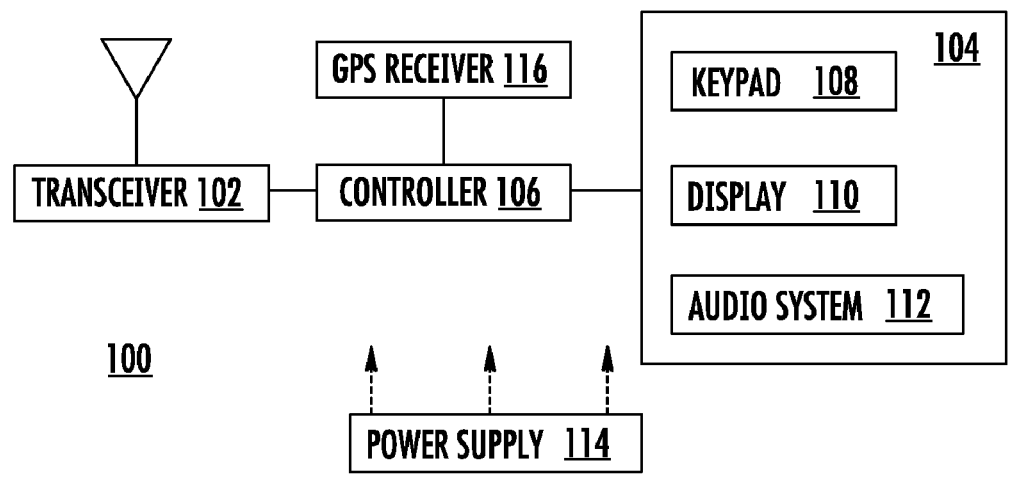
FIG. 1
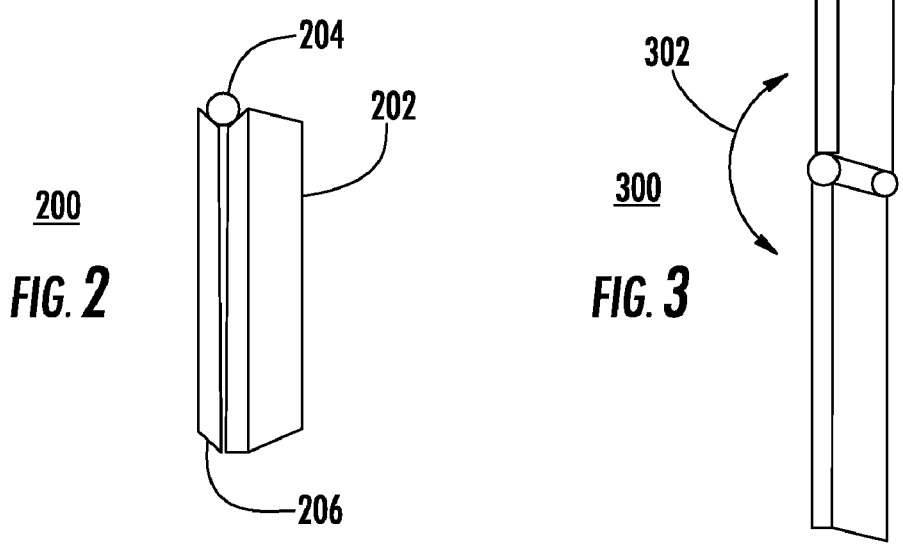
FIG. 2
FIG. 3

WIRELESS COMMUNICATION DEVICE

FIELD OF THE DISCLOSURE

This present disclosure is directed generally to communication devices, and more particularly to a wireless communication device.

BACKGROUND

When mobile telephones were originally introduced years ago they were housed in a large housing assembly (referred to in common parlance as brick phones). The usefulness of these mobile telephones was rather limited because of their excessive size. Over time, mobile telephones were designed to be smaller in part, due to advances in battery technologies, surface mount components, housing assembly improvements, and related components. Today, mobile phones are very small, such that they fit within the palm of an adult hand.

BRIEF DESCRIPTION OF THE DRAWINGS

FIG. 1 depicts a schematic diagram of a wireless communication device of the present disclosure.

FIG. 2 depicts a side view of a wireless communication device of the present disclosure in a closed position.

FIG. 3 depicts a side view of the wireless communication device of FIG. 2 in an open position.

DETAILED DESCRIPTION

Figure 4:
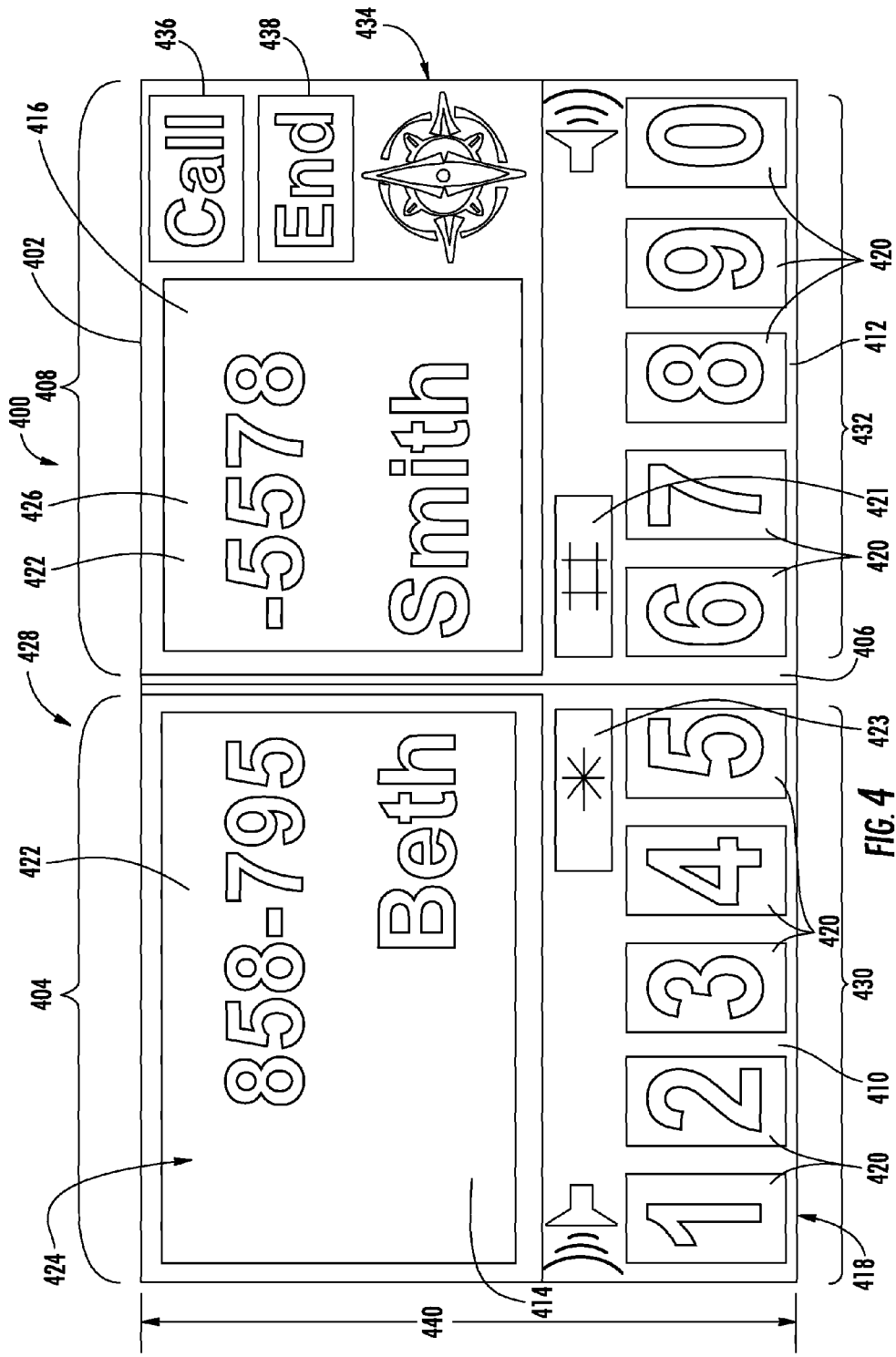
FIG. 4 depicts an exemplary embodiment of a wireless communication device.

FIG. 1 depicts an exemplary embodiment of a wireless communication device 100. The communication device 100 can comprise a wireless transceiver 102, a user interface (UI) 104, a global positioning system (GPS) receiver, a power supply 114, and a controller 106 for managing operations thereof. The wireless transceiver 102 utilizes common communication technology that supports access technologies such as cellular, software defined radio (SDR), WiMAX and WiFi. The UI 204 can include a depressible or touch sensitive foldable keypad 108 for manipulating operations of the communication device 100. The UI 204 can further include a foldable display 110 such as monochrome or color LCD (Liquid Crystal Display) for conveying images to the end user of the communication device 100. The audio system 112 of the UI 204 utilizes common audio technology for conveying and intercepting audible signals of an end user of the wireless communication device.

The power supply 114 can utilize common power management technologies (such as replaceable batteries, supply regulation technologies, and charging system technologies) for supplying energy to the components of the wireless communication device 100 to facilitate portable applications. The GPS receiver 116 can utilize common technology for receiving satellite signals from a constellation of satellites to determine a location coordinate of the wireless communication device 100. The controller 106 can utilize computing technologies such as a microprocessor and/or digital signal processor (DSP) with associated storage memory such a Flash, ROM, RAM, SRAM, DRAM or other like technologies. The wireless communication device 100 can be configured to be internet capable, blue-tooth compatible, and hearing aide compatible in accordance with ANSI standards.

FIG. 2 depicts an exemplary view of a wireless communication device 200 formed from a first portion 202 and a second portion 206. First and second portions 202, 206 can be pivotably coupled together around hinge 204 so that the first and second portions can be moved between a closed position shown in FIG. 2 and an open position shown in FIG. 3.

FIG. 3 depicts an exemplary view of the wireless communication device 300. The wireless communication device 300 is shown in the open position in which first and second portions 202, 206 open in the direction of arrows 302.

In one embodiment of the present disclosure, as shown in FIG. 4, a wireless communication device 400 can include a housing assembly 402 formed from a first section 404 that is rotatably coupled about an axis 406 to a second section 408 such that the first and second sections 404, 408 are movable between a closed position in which a first side 410 of the first section 404 is aligned with and in close proximity to a first side 412 of the second section 108. The first and second sections 404, 408 are the same as shown in the side view of FIGS. 2 and 3 and identified as 202, 206. The wireless communication device 400 can include a first display screen 414 positioned in the first section 404 and visible through the first side 410 of the first section 404 and can include a second display screen 416 positioned in the second section 408 and visible through the first side 412 of the second section 408. The first and second display screens 414, 416 can be configured to display images, such as, but not limited to text, such as phone numbers, text messages, digital images, video images, and the like. The wireless communication device 400 can also include a keypad 418 including keys 420 on the first section 404 and keys 420 on the second section 408, thereby creating a foldable keypad 418 rotatable about the axis 406 between the first and second sections 404, 408.

In another embodiment of the present disclosure, as shown in FIG. 4, a display 422 can include first and second display screens 414, 416 for incorporation in a wireless communication device 400 for contiguous viewing of images. The display 422 is also shown schematically as display 110 in FIG. 1. The wireless communication device 400 can include a housing assembly 402 formed from a first section 404 that is rotatably coupled about an axis 406 to a second section 408. The first and second display screens 414, 416 can be positioned in the first and second sections 404, 408 of the housing assembly 402 respectively with exposed viewing areas, 424, 426, respectively. The wireless communication device 400 can include a keypad 418 with keys 420 on the first section 404 and keys 420 on the second section 408, thereby creating a foldable keypad 418 rotatable about the axis 406 between the first and second sections 404, 408.

In yet another embodiment of the present disclosure, as shown in FIG. 4 a user interface device 428 can be formed from first and second portions 430, 432 of a keypad 418 for incorporation in a wireless communication device 400 such that the first portion 430 of the keypad 418 can be included in a first section 404 of a housing assembly 402 of the wireless communication device 400, and the second portion 432 of the keypad 418 can be included in a second section 408 of the housing assembly 402. The first and second sections 404, 408 of the housing assembly 402 can be rotatably coupled about an axis 406. The wireless communication device 400 can also include first and second display screens 414, 416 positioned in the first and second sections 404, 408 with exposed viewing areas for contiguous viewing of images.

As shown in FIG. 4, the wireless communication device 400 can be formed from a housing assembly 402 including a first section 404 rotatably coupled to the second section 408. The size of the housing assembly can vary. In one embodiment, the housing assembly 402 can, when the first and second sections 404, 408 are in the closed position, fit within the palm of an adult hand. The wireless communication device 400 can include common computing and communication technology (such as a microprocessor, digital signal processor, GSM, CDMA and/or WiFi transceiver and so forth) for enabling the wireless communication device 400 to communicate with common wireless communication systems such as cellular and WiFi base stations.

A height 140 of the first and second sections 404, 408 aligned with the axis 406 can be less than a length of the first section 404 in the direction generally orthogonal to the axis 406. Such a configuration yields a wireless communication device 400 in which the first and second display screens 414, 416 collectively have a length greater than the height. In at least one embodiment, the wireless communication device 400 can be for example 5.5 inches long and about two inches high. A first display screen 414 can be positioned in the first section 404, and a second display screen 416 can be positioned in the second section 408 such that the first and second display screens 414, 416 are viewable on the same side of the wireless communication device 400. The first and second display screens 414, 416 can be sized and configured to facilitate easy viewing of the images displayed by the first and second screens 414, 416 by those with poor vision. In one embodiment, the first and second display screens 414, 416 can be sized to asymmetrically form for example about ⅔ of the first sides 410, 412 of the first and second sections, thereby facilitating easy viewing. In such a configuration, the wireless communication device 400 can form a foldable clam shell style mobile phone.

In at least one embodiment, the first and second display screens 414, 416 can be configured to display text, such as phone numbers for inputting purposes and caller identification (caller ID) purposes in mobile phones, in an enlarged font size for easy viewing by those with poor vision. The first and second display screens 414, 416 and supporting systems can be configured such that images can be displayed across both the first and second display screens 414, 416. For instance, as shown in FIG. 4, an image, such as a phone number or other image, can be displayed across the first and second display screens 414, 416 such that a portion of the image is displayed on the first display screen 414 and a remaining portion of the image is displayed on the second display screen 416.

The wireless communication device 400 can also include a keypad 418 positioned across the first and second sections 404, 408, thereby forming a keypad that is foldable about the axis 406. As shown in FIG. 4, the keypad 418 can be positioned beneath the first and second display screens 414, 416. The keypad 418 an include numerals 0 through 9. As shown in FIG. 4, a portion 430 of the keypad 418 on the first section 404 can include numerals 1-5, and a portion 432 of the keypad 418 on the second section 408 can include numerals 6-9 and 0. The keys 420 may also include a # key 421 and a ✕ key 423, as shown in FIG. 4. The # key 421 and the ✕ key 423 may be positioned between the first and second display screens 414, 416 and the keys 420 and proximate to the axis 406. The keys 420 can each have exposed surface areas sufficiently large to be visualized by a user with impaired vision. In at least one embodiment, the keys 420 can have for example exposed surface areas with cross-sectional areas of between about 0.0625 square inches and about 0.5625 square inches. Such cross-sectional areas can, in one embodiment, equate to keys 420 with dimensions of between about one quarter of an inch by one quarter of an inch and about three quarters of an inch by three quarters of an inch. The keys 420 can have space between the keys 420 generally equal to cross-sectional areas of the keys 420 to facilitate easy use by users with arthritic or unstable hands, users with poor vision, or users with other conditions. Although not shown, the keys 420 can also show alpha and special characters (e.g., abc . . . etc.) to perform dialing by name, special telephonic signaling functions (✕72 for call forwarding, etc.), and other known telephonic dialing techniques.

The wireless communication device 400 can also include a navigation key 434 positioned on the second section 408 adjacent to the second display screen 416 and proximate to an end of the second section 408 that is opposite to the axis 406 at which the first section 404 is attached to second section 408. The navigation key 434 an be oversized such that it is sized large enough to be easily used by users with impaired vision, trembling hands, arthritic hands, or other such condition. The navigation key 434 can enable a user to move through common functional modules of the wireless communication device 400 including, but not limited to, systems setup, an address book, volume, ring tones, messages, calendar, memos, call timers, recent call log, profiles, call alerts, GPS location, and other present and future modules.

The wireless communication device 400 can also include a call key 436 (also referred to as a "send" key) and an end key 438 on the second section 408 proximate to the navigation key 434. The call key 436 can be used to initiate a wireless communication, such as a phone call, from the wireless communication device 400. The wireless communication device 400 can be configured to transmit and receive wireless communications. The end key 438 can be used to terminate a wireless communication, such as a phone call, from the wireless communication device 400. The call and end keys 436, 438 can be positioned above the navigation key 434, as shown in FIG. 4.

Figure 5:
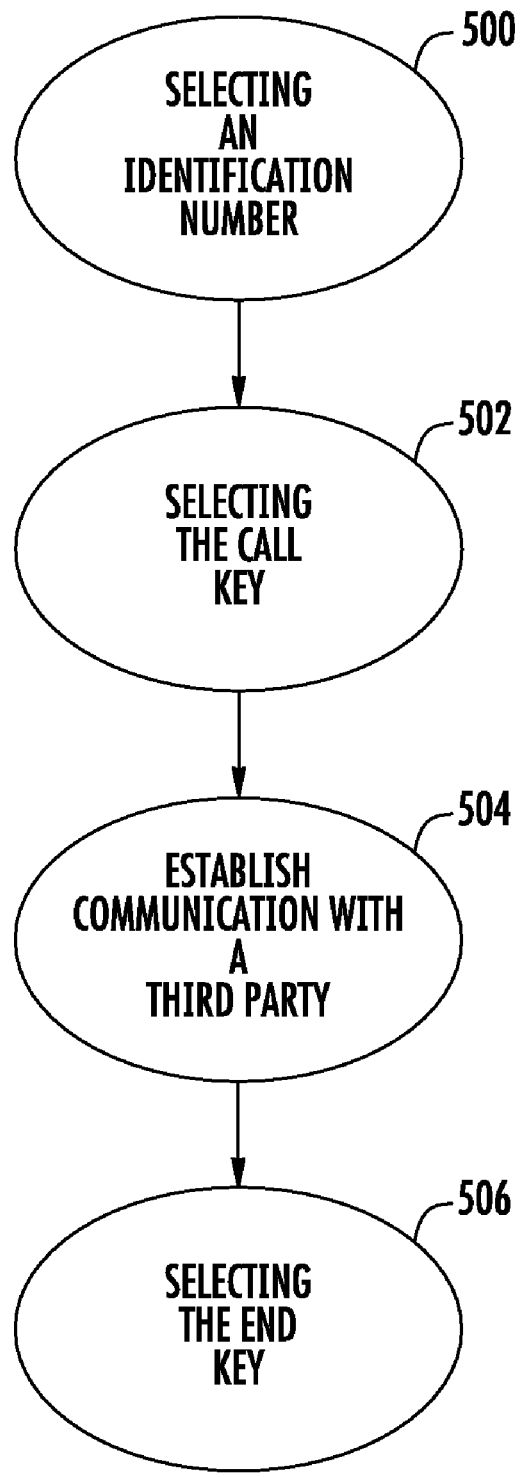
FIG. 5 depicts an exemplary method of transmitting a wireless communication using the wireless communication device.

As shown in FIG. 5, the wireless communication device 400 can be used to transmit and receive wireless communications, such as, but not limited to phone calls. The wireless communication device 400 can be used to transmit a wireless communication by first selecting an identification number in step 500, such as a phone number or other appropriate identification number associated with another communication device. Selecting an identification number in step 500 can include selecting an identification number from a list of stored numbers in a contact book of the wireless communication device 400, inputting identification numbers with the foldable keypad 418, or other appropriate method. Once an identification number has been selected, a wireless communication can be initiated by depressing the call key 436 in step 502. Once the call key 436 has been depressed, a user can establish communication with a third party in step 504. Communication can be established by talking into a microphone on the wireless communication device 400. Communication can also be established by inputting sounds into the microphone or inputting tones by depressing the keys 420 on the keypad 418. The communication can be ended by depressing the end key 438 in step 506.

Figure 6:
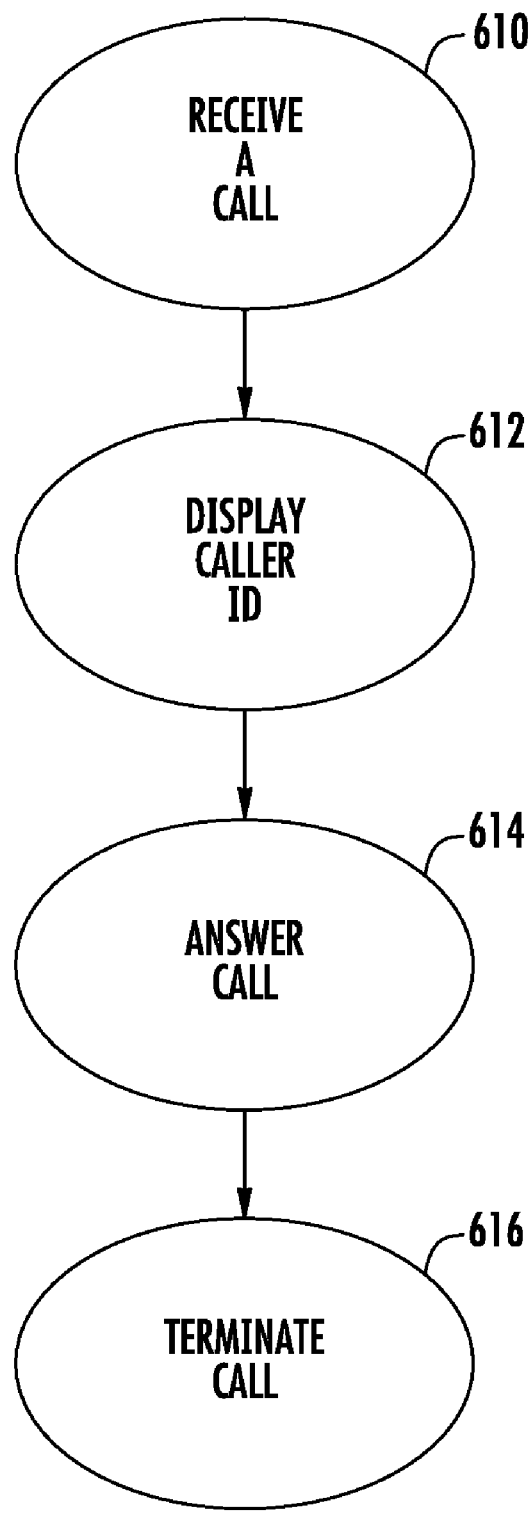
FIG. 6 depicts an exemplary method of receiving a wireless communication using the wireless communication device.

As shown in FIG. 6, the wireless communication device 400 can be used to receive calls. For example, a user may receive a call in step 600. The user may be notified of an incoming call via an audible alert, such as, but not limited to, a ring tone, song, or other sound, a visual alert, a vibration, or any combination thereof. Upon receiving the call, the wireless communication device 400 can display a caller ID feature in 602 in which the telephone number associated with the incoming call is displayed on the display 422. The user can depress the call key 436 in step 604 if the user desires to initiate a conversation with the caller. The user can then begin a conversation with the caller. The user can terminate the call by depressing the end key 438 in 606.

From the foregoing descriptions, it would be evident to one with ordinary skill in the art that the aforementioned embodiments can be modified, reduced, or enhanced without departing from the scope and spirit of the claims described below. For example, a Qwerty keypad can be used in place of the numeric keypad of FIG. 4. Additionally, the foldable keypad 418, and foldable the display screens 414, 416 can have other orientations without departing from the scope of the claims. Other suitable modifications can be applied to the present disclosure. Accordingly, the reader is directed to the claims for a fuller understanding of the breadth and scope of the present disclosure.

Figure 7:
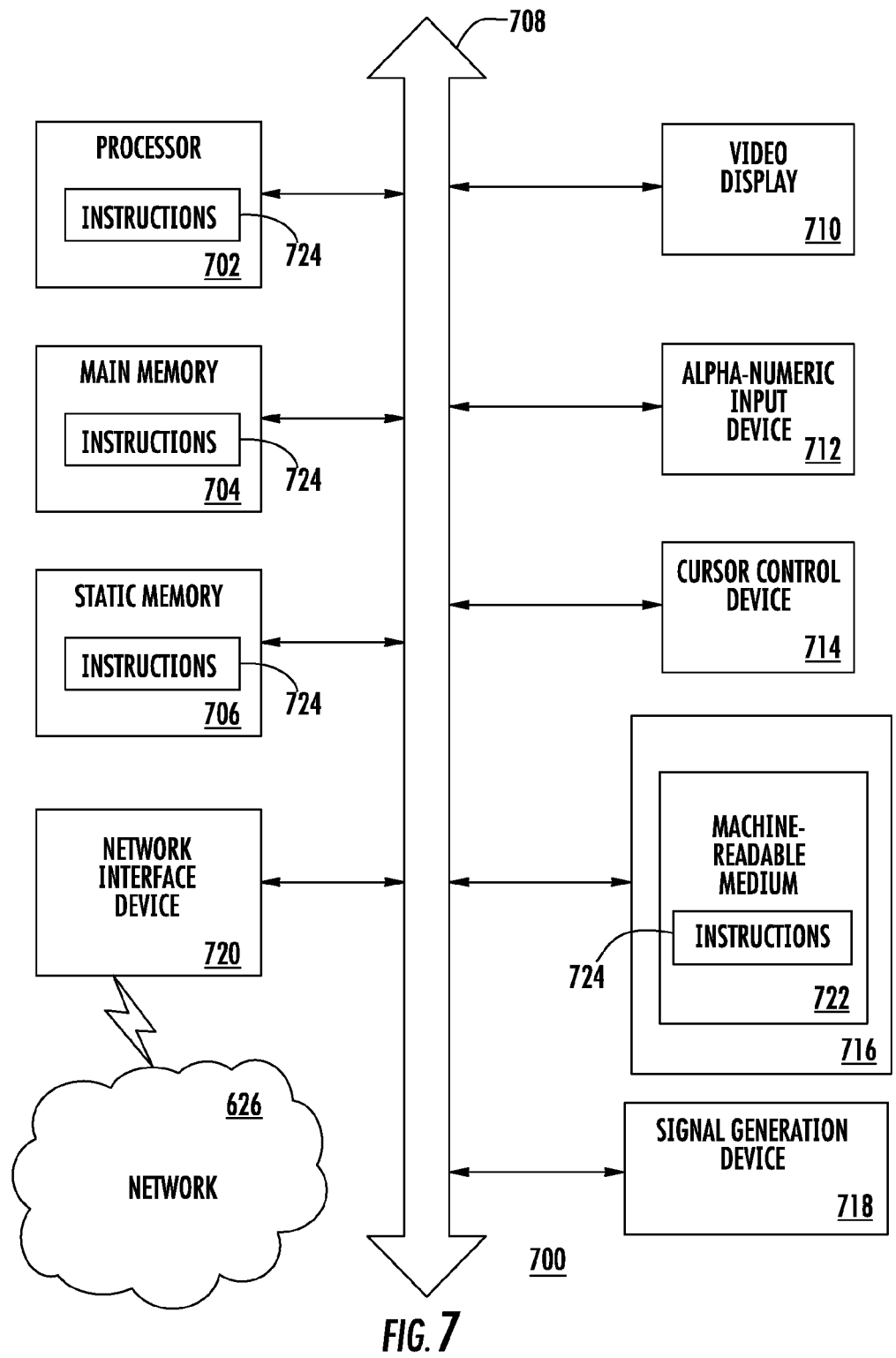
FIG. 7 depicts an exemplary diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a mass storage medium 716, a signal generation device 718 (e.g., a speaker or remote control) and a network interface device 720.

The mass storage medium 716 may include a computer-readable storage medium 722 on which is stored one or more sets of instructions (e.g., software 724) embodying any one or more of the methodologies or functions described herein, including those methods illustrated above. The computer-readable storage medium 722 can be an electromechanical medium such as a common disk drive, or a mass storage medium with no moving parts such as Flash or like non-volatile memories. The instructions 724 may also reside, completely or at least partially, within the main memory 704, the static memory 706, and/or within the processor 702 during execution thereof by the computer system 700. The main memory 704 and the processor 702 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the computer-readable storage medium 722 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless communication device, comprising:
a housing assembly formed from a first section that is rotatably coupled about an axis to a second section such that the first and second sections are movable between a closed position in which a first side of the first section is aligned with and in close proximity to a first side of the second section;
a first display screen positioned in the first section and visible through the first side of the first section;
a second display screen positioned in the second section and visible through the first side of the second section;
wherein the first and second display screens are configured to display images;
a keypad including keys on the first section and keys on the second section, thereby creating a foldable keypad rotatable about the axis between the first and second sections; and
a navigation key positioned on the second section adjacent to the second display screen and proximate to an end of the second section that is opposite to the axis at which the first section is attached to second section.

2. The wireless communication device of claim 1, wherein the keypad comprises keys for numerals 0 through 9.

3. The wireless communication device of claim 2, wherein the keys each have exposed surface areas sufficiently large to be visualized by a user with impaired vision.

4. The wireless communication device of claim 3, wherein the keys have space between the keys generally equal to a cross-sectional area of the keys.

5. The wireless communication device of claim 1, wherein a height of the first and second sections aligned with the axis is less than a length of the first section in the direction generally orthogonal to the axis.

6. The wireless communication device of claim 1, comprising a call key and an end key on the second section proximate to the navigation key.

7. The wireless communication device of claim 1, wherein the first and second display screens forms at least about 213 of the first sides of the first and second sections.

8. The wireless communication device of claim 1, wherein the wireless communication device comprises computing and communications technology to transmit and receive wireless communications.

9. A display, comprising first and second display screens for incorporation in a wireless communication for contiguous viewing of images, wherein the wireless communication device comprises:
a housing assembly formed from a first section that is rotatably coupled about an axis to a second section;
the first and second display screens positioned in the first and second sections of the housing assembly respectively with exposed viewing areas;
a keypad including keys on the first section and keys on the second section, hereby creating a foldable keypad rotatable about the axis between the first and second sections; and
a navigation key positioned on the second section adjacent to the second display screen and proximate to an end of the second section that is opposite to the axis at which the first section is attached to second section, a call key and an end key on the second section proximate to the navigation key.

10. The display of claim 9, wherein the keypad comprises keys for numerals 0 through 9.

11. The display of claim 10, wherein the keys each have exposed surface areas sufficiently large to be visualized by a user with impaired vision.

12. The display of claim 11, wherein the keys have space between the keys generally equal to a cross-sectional area of the keys.

13. The display of claim 9, wherein a height of the first and second sections aligned with the axis is less than a length of the first section in the direction generally orthogonal to the axis.

14. The display of claim 9, wherein the first and second display screens forms at least about ⅔ of the first sides of the first and second sections.

* * * * *